United States Patent
Yang et al.

(10) Patent No.: US 11,522,913 B1
(45) Date of Patent: Dec. 6, 2022

(54) SIMPLIFYING NETWORKING SETUP COMPLEXITY FOR SECURITY AGENTS

(71) Applicant: Rapid7, Inc., Boston, MA (US)

(72) Inventors: Xi Yang, East York (CA); Paul Miseiko, Mississauga (CA); Bingbin Li, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/405,338

(22) Filed: Aug. 18, 2021

Related U.S. Application Data

(63) Continuation-in-part of application No. 16/886,972, filed on May 29, 2020, now Pat. No. 11,297,036, and a continuation-in-part of application No. 16/558,485, filed on Sep. 3, 2019, now Pat. No. 11,201,897.

(51) Int. Cl.
*H04L 9/40* (2022.01)
(52) U.S. Cl.
CPC ................... *H04L 63/166* (2013.01)
(58) Field of Classification Search
CPC ..................................... H04L 63/166
USPC ......................................... 726/11
See application file for complete search history.

(56) References Cited

U.S. PATENT DOCUMENTS

| | | | |
|---|---|---|---|
| 8,041,856 B2 * | 10/2011 | Raikar | H04L 12/40058 710/33 |
| 10,104,039 B1 * | 10/2018 | Knecht | H04L 12/4633 |
| 10,193,864 B2 | 1/2019 | Toy | |
| 10,270,687 B2 | 4/2019 | Mithyantha | |
| 10,289,510 B1 * | 5/2019 | Janeczek | G06F 11/30 |
| 10,298,694 B1 * | 5/2019 | Tagore | H04L 63/0209 |
| 10,348,767 B1 | 7/2019 | Lee et al. | |
| 10,367,746 B2 | 7/2019 | Xu et al. | |
| 10,389,736 B2 | 8/2019 | Dawes et al. | |
| 10,423,309 B2 | 9/2019 | Kitchen et al. | |
| 10,425,446 B2 | 9/2019 | Kasbekar | |
| 10,430,263 B2 | 10/2019 | Polar Seminario | |
| 10,447,553 B2 | 10/2019 | Biran et al. | |
| 10,484,334 B1 | 11/2019 | Lee et al. | |
| 10,492,102 B2 | 11/2019 | Raleigh et al. | |
| 10,496,432 B1 | 12/2019 | Zhang et al. | |
| 10,523,658 B2 | 12/2019 | Brouchier et al. | |

(Continued)

OTHER PUBLICATIONS

Puneet Kumar, Behnam Dezfouli, Implementation and analysis of QUIC for MQTT, Computer Networks, vol. 150, 2019, pp. 28-45, ISSN 1389-1286, https://doi.org/10.1016/j.comnet.2018.12.012. (Year: 2019).*

(Continued)

*Primary Examiner* — Melvin H Pollack
(74) *Attorney, Agent, or Firm* — Ashwin Anand

(57) ABSTRACT

Methods, systems, and processes to simplify networking setup complexity for security agents implemented in cyber-security computer environments are disclosed. A request with an intentionally bad Transport Layer Security (TLS) handshake is transmitted from an agent to a server. An indication is received from the server that the request has been rejected. A Round Trip Time (RTT) of the request and rejection of the request is determined. The server is then pinged based on the RTT. The subsequent pinging does not require whitelisting of an additional port and does not negatively interact with network intermediaries that support protocol detection.

5 Claims, 15 Drawing Sheets

(56) References Cited

U.S. PATENT DOCUMENTS

| | | | |
|---|---|---|---|
| 10,542,097 B2 | 1/2020 | Agarwal et al. | |
| 10,616,075 B2 | 4/2020 | Dawes et al. | |
| 10,623,390 B1 | 4/2020 | Rosenhouse | |
| 10,645,172 B1 | 5/2020 | Hussain et al. | |
| 10,680,831 B2 | 6/2020 | Abraham | |
| 10,680,945 B1 | 6/2020 | Ye et al. | |
| 10,708,233 B2 | 7/2020 | Goyal et al. | |
| 10,721,214 B2 | 7/2020 | Bhat et al. | |
| 10,750,327 B2 | 8/2020 | Patel et al. | |
| 10,771,351 B2 | 9/2020 | Douglas et al. | |
| 10,778,684 B2 | 9/2020 | Gupta et al. | |
| 10,791,118 B2 | 9/2020 | Konda et al. | |
| 10,791,168 B1 | 9/2020 | Dilley et al. | |
| 10,805,104 B2 | 10/2020 | Chen et al. | |
| 10,805,352 B2 | 10/2020 | Ithal et al. | |
| 10,826,691 B2 | 11/2020 | Rohel et al. | |
| 10,826,905 B2 | 11/2020 | Gujarathi | |
| 10,826,916 B2 | 11/2020 | Nedbal et al. | |
| 10,833,949 B2 | 11/2020 | Liguori et al. | |
| 10,841,336 B2 | 11/2020 | Cahana et al. | |
| 10,848,974 B2 | 11/2020 | Bachmutsky et al. | |
| 10,887,380 B2 | 1/2021 | Pahwa et al. | |
| 10,904,342 B2 | 1/2021 | Toilet et al. | |
| 10,911,409 B2 | 2/2021 | Wang et al. | |
| 10,930,157 B2 | 2/2021 | Spector et al. | |
| 10,944,723 B2 | 3/2021 | Ahuja et al. | |
| 10,944,836 B2 | 3/2021 | Olds et al. | |
| 10,951,589 B2 | 3/2021 | Neystadt et al. | |
| 10,958,625 B1 | 3/2021 | Thornewell et al. | |
| 10,977,140 B2 | 4/2021 | Hu et al. | |
| 10,986,027 B1* | 4/2021 | Sears | H04L 12/4641 |
| 10,997,303 B2 | 5/2021 | Kraft | |
| 11,025,601 B2 | 6/2021 | Arisankala et al. | |
| 11,349,821 B2* | 5/2022 | Hallam-Baker | H04L 63/20 |
| 2018/0034691 A1* | 2/2018 | Amend | H04L 41/0806 |
| 2018/0097726 A1* | 4/2018 | Knutsen | H04L 47/726 |
| 2018/0103123 A1* | 4/2018 | Skog | H04L 69/14 |
| 2018/0316724 A1* | 11/2018 | Reddy | H04L 9/0827 |
| 2019/0044981 A1* | 2/2019 | Kielhofner | H04L 69/18 |
| 2019/0052597 A1* | 2/2019 | Raghunath | H04L 41/0893 |
| 2019/0149538 A1 | 5/2019 | Friel et al. | |
| 2019/0254013 A1* | 8/2019 | Chang | H04L 67/12 |
| 2019/0260599 A1 | 8/2019 | Williams et al. | |
| 2019/0306111 A1* | 10/2019 | Tang | H04L 43/0864 |
| 2019/0306282 A1* | 10/2019 | Masputra | G06F 9/5005 |
| 2019/0312815 A1* | 10/2019 | Altman | H04L 43/0876 |
| 2019/0327135 A1 | 10/2019 | Johnson et al. | |
| 2019/0349449 A1* | 11/2019 | Shribman | H04L 67/60 |
| 2020/0008120 A1* | 1/2020 | Beck | H04W 36/30 |
| 2020/0008248 A1* | 1/2020 | Beck | H04W 76/15 |
| 2020/0021514 A1* | 1/2020 | Michael | H04L 45/745 |
| 2020/0045131 A1 | 2/2020 | Nigam et al. | |
| 2020/0076740 A1* | 3/2020 | Kim | H04L 63/0428 |
| 2020/0076902 A1 | 3/2020 | Huang et al. | |
| 2020/0084156 A1* | 3/2020 | Gochi Garcia | H04L 47/193 |
| 2020/0159776 A1 | 5/2020 | Kitchen | |
| 2020/0162432 A1 | 5/2020 | Ludin et al. | |
| 2020/0169584 A1* | 5/2020 | Penner | H04L 63/105 |
| 2020/0195560 A1* | 6/2020 | Vilke | H04L 47/127 |
| 2020/0195567 A1* | 6/2020 | Selvidge | H04L 43/0882 |
| 2020/0236114 A1 | 7/2020 | Patil et al. | |
| 2020/0245160 A1* | 7/2020 | Chu | H04L 43/12 |
| 2020/0275358 A1* | 8/2020 | Bordeleau | H04L 41/5054 |
| 2020/0296026 A1* | 9/2020 | Michael | H04L 43/08 |
| 2020/0296036 A1* | 9/2020 | Chu | H04L 45/1283 |
| 2020/0336316 A1 | 10/2020 | Jain et al. | |
| 2020/0336398 A1* | 10/2020 | Thomas | H04L 41/20 |
| 2020/0366717 A1 | 11/2020 | Chaubey | |
| 2020/0389469 A1 | 12/2020 | Litichever et al. | |
| 2021/0044678 A1* | 2/2021 | Patil | H04L 69/164 |
| 2021/0067556 A1 | 3/2021 | Tahan | |
| 2021/0184801 A1* | 6/2021 | El Hamss | H04L 1/1854 |
| 2021/0273882 A1* | 9/2021 | Stephan | H04L 45/306 |
| 2021/0314254 A1* | 10/2021 | Detal | H04L 45/24 |
| 2021/0345162 A1* | 11/2021 | Sarker | H04L 69/164 |
| 2021/0367870 A1* | 11/2021 | Kim | H04L 43/045 |
| 2022/0053385 A1* | 2/2022 | Li | H04W 36/08 |
| 2022/0095111 A1* | 3/2022 | Fu | H04L 63/0853 |
| 2022/0159433 A1* | 5/2022 | Flinck | H04W 12/06 |

OTHER PUBLICATIONS

Hovav Shacham, Dan Boneh, and Eric Rescorla. 2004. Client-side caching for TLS. ACM Trans. Inf. Syst. Secur. 7, 4 (Nov. 2004), 553-575. https://doi.org/10.1145/1042031.1042034 (Year: 2004).*

Fangfan Li, Arash Molavi Kakhki, David Choffnes, Phillipa Gill, and Alan Mislove. 2016. Classifiers Unclassified: An Efficient Approach to Revealing IP Traffic Classification Rules. Proceedings of the 2016 Internet Measurement Conference (IMC '16). Association for Computing Machinery, 239-245. (Year: 2016).*

Abdulrahman Al-Dailami, Chang Ruan, Zhihong Bao, Tao Zhang, "QoS3: Secure Caching in HTTPS Based on Fine-Grained Trust Delegation", Security and Communication Networks, vol. 2019, Article ID 3107543, 16 pages, 2019. https://doi.org/10.1155/2019/3107543 (Year: 2019).*

Banjar, A., Pupatwibul, P., Braun, R. (2015). Comparison of TCP/IP Routing Versus OpenFlow Table and Implementation of Intelligent Computational Model to Provide Autonomous Behavior. Computational Intelligence and Efficiency in Engineering System (springer). 121-142. (Year: 2015).*

Gore, Chinmay Prashant, and Péter Suskovics. "Design and development of a monitoring agent for cloud edge and IoT devices to enable dynamic orchestration." (2019). (Year: 2019).*

M. Liyanage, M. Ylianttila and A. Gurtov, "Securing the control channel of software-defined mobile networks," Proceeding of IEEE International Symposium on a World of Wireless, Mobile and Multimedia Networks 2014, 2014, pp. 1-6, doi: 10.1109/WoWMoM.2014.6918981. (Year: 2014).*

S. Lal, A. Kalliola, I. Oliver, K. Ahola and T. Taleb, "Securing VNF communication in NFVI," 2017 IEEE Conference on Standards for Communications and Networking (CSCN), 2017, pp. 187-192, doi: 10.1109/CSCN.2017.8088620. (Year: 2017).*

N. Bitar S. Gringeri and T. J. Xia "Technologies and protocols for data center and cloud networking," in IEEE Communications Magazine, vol. 51, No. 9, pp. 24-31, Sep. 2013, doi: 10.1109/MCOM.2013.6588646. (Year 2013).

Marcelo R. Nascimento, Christian E. Rothenberg et al. 2011. Virtual routers as a service: the RouteFlow approach leveraging software-defined networks. Proceedings of the 6th International Conference on Future Internet Technologies (CFI '11). Association for Computing Machinery, New York, NY, 34-37. (Year: 2011).

F. Liu W. Guo Z. Q. Zhao and W. Chou "Saas Integration for Software Cloud," 2010 IEEE 3rd International Conference on Cloud Computing, 2010, pp. 402-409, doi: 10.1109/CLOUD.2010.67. (Year: 2010).

Justine Sherry Shaddi Hasan Colin Scott, Arvind Krishnamurthy, Sylvia Ratnasamy, and Vyas Sekar. 2012. Making middleboxes someone else's problem: network processing as a cloud service. <i>SIGCOMM Comput. Commun. Rev.</i> 42,4 (Oct. 2012), 13-24. DOI:https://doi.org/10.1145/2377677.2377680 (Year: 2012).

H. Yamauchi, A. Nakao, M. Oguchi, S. Yamamoto and S. Yamaguchi, "A Study on Service Identification Based on Server Name Indication Analysis," 2019 Seventh International Symposium on Computing and Networking Workshops (CANDARW), 2019, pp. 470-474, doi: 10.1109/CANDARW.2019.00089. (Year: 2019).

Polk, T., Mckay, K., & Chokhani, S. (2014). Guidelines for the selection, configuration, and use of transport layer security (TLS) implementations. NIST special publication, 800(52), 32. (Year: 2014).

Eastlake, D. "Transport Layer Security (TLS) Extensions: Extension Definitions," RFC 6066, Jan. 2011 (Year: 2011).

Hoffman, P. and Schlyter J. "The DNS-Based Authentication of Named Entities (DANE) Transport Layer Security (TLS) Protocol: TLSA," RFC 6698, Aug. 2012. (Year: 2012).

Saint-Andre, P. and Hodges, J. "Respresentation and Verification of Domain-Based Application Service Identity Within Internet Public

(56) References Cited

OTHER PUBLICATIONS

Key Infrastructure Using X.509 (PKIX) Certificates in the Context of Transport Layer Security (TLS)," RFC 6125, Mar. 2011. (Year: 2011).

Rescorla, E. "The Transport Layer Security (TLS) Protocol Version 1.3," RFC 8446, Aug. 2018. (Year: 2018).

Brown, M. and Housley, R. "Transport Layer Security (TLS) Authorization Extensions," RFC 5878, May 2010. (Year: 2010).

\* cited by examiner

| Test Case | Test Area | Description |
|---|---|---|
| Test Case 1 | Agent communication | Configure direct connected Agent to use SSL ping with Bluecoat proxy that has protocol detection enabled |
| | | Configure direct connected Agent to use SSL ping with Bluecoat proxy that has protocol detection disabled |
| | | Configure direct connected Agent to use SSL ping with squid HTTP proxy |
| | | Configure direct connected Agent to use SSL ping without proxy |
| | | Configure collector connected Agent to use SSL ping |
| | ping test in asset_info (code removed) | Verify Agent behaves the same as before when ssl ping is disabled |
| | | Verify SSL ping test result is visible on yggdrasil |
| | | Verify SSL ping test pass when Agent is pinging valid endpoint |
| | | Verify SSL ping test times out and fail when Agent is pinging invalid endpoint |

FIG. 14B

SIMPLIFYING NETWORKING SETUP COMPLEXITY FOR SECURITY AGENTS

CROSS-REFERENCE TO RELATED APPLICATIONS

The present application claims the benefit of priority and is a continuation-in-part of the following pending United States Utility Patent Applications: (1) Ser. No. 16/558,485 titled "Secure Multiplexed Routing" and filed on Sep. 3, 2019 and (2) Ser. No. 16/886,972 titled "Single Whitelisted Ingress Endpoint On 1 & 2 Way TLS Connections" and filed on May 29, 2020, the disclosures of both which are incorporated by reference as if set forth in their entirety herein.

BACKGROUND

Field of the Disclosure

This disclosure is related is to simplifying networking setup complexity in agent-based cybersecurity computing environments by pinging servers by leveraging the transport layer security (TLS) protocol.

Description of the Related Art

Modern centralized cloud-based cybersecurity platforms (e.g., cloud platforms) can deploy agents for data collection and analysis (DCA). An agent is lightweight software that can be installed on various supported computing assets in the cloud or on-premises to centralize and monitor data. The agent provides endpoint visibility and detection by collecting live system information (e.g., basic asset identification information, running processes, and logs) from computing assets and sends this data back to the cloud platform for analysis. The agent can include a smart connection mode capability where the agent uses a proprietary ping protocol through Transmission Control Protocol (TCP) to servers and selects an optimal server by comparing the Round Trip Time (RTT) of the pings. Because the ping is proprietary and on the same port as the communication port, customers only need minimal networking setup. Unfortunately, the foregoing setup can fail in several common customer network environments.

Furthermore, deployments of agents require proper connectivity to function. For example, customers require whitelisting rules to configure on their computing assets so that their corresponding agents can communicate with the cloud platform. Unfortunately, network load balancing (NLB) for transport layer security (TLS) connections associated with a single whitelisted ingress endpoint greatly increases networking setup complexity for customers of the cloud platform.

Finally, "firewalls" are technological measures used to prevent unauthorized communications between computers on different computer networks. Some firewalls require configuration to permit communications between computers on different computer networks; these configurations are colloquially referred to as "holes" in the firewall, continuing the analogy. Organizations typically want to minimize the number of holes they create in their firewalls—each hole reduces organizational security, requires administrator time and effort, etc. However, the introduction of certain services or vendor products to a network may require reconfiguring the firewall to allow for multiple endpoints or services. This problem is magnified when the services or products are controlled by the third party, who typically does not have permission to manage their customer's firewall. This at the very least inconveniences the service provider or vendor, as they have to take the time to instruct their client to modify their firewall. The client then has to expend resources to make the required modifications to allow for subsequent data transmissions, assuming they agree to do so. In some cases, the client may have to seek and obtain internal and/or regulatory approval to make the required change. A need exists, therefore, for more effective systems and methods for managing data transmissions.

SUMMARY OF THE DISCLOSURE

Disclosed herein are methods, systems, and processes to simplify networking setup complexity in agent-based cybersecurity computing environments by pinging servers by leveraging the transport layer security (TLS) protocol. One such method involves, transmitting, from an agent to a server, a request with an intentionally bad Transport Layer Security (TLS) handshake, receiving, from the server, an indication that the request has been rejected, determining the Round Trip Time (RTT) of the request and rejection of the request, and pinging the server based on the RTT of the (intentionally failed) request. In certain embodiments, the pinging does not require whitelisting of an extra port, and the pinging does not negatively interact with one or more network intermediaries that support protocol detection.

Certain other embodiments involve routing agent-based network traffic and non-agent-based network traffic through a single whitelisted internet protocol (IP) endpoint, separating out the non-agent-based network traffic, and terminating the non-agent-based network traffic on an elastic load balancer. In one embodiment, the agent-based network traffic represents two-way TLS traffic associated with a TLS connection. In another embodiment, the non-agent-based network traffic represents one-way TLS traffic associated with the TLS connection. In some embodiments, separating out the one-way TLS traffic includes tunneling the TLS connection from a network load balancer to a reverse proxy based on one or more server name indication (SNI) fields in a TLS header of the TLS connection. In other embodiments, the method involves determining whether a service routed to the network load balancer is the one-way TLS traffic or the two-way TLS traffic based on the TLS header. In certain embodiments, the TLS connection is a multiplexed TLS connection that includes the one-way TLS traffic and the two-way TLS traffic. In this example, the one-way TLS traffic and the two-way TLS traffic share the TLS header. In one embodiment, the method involves terminating the two-way TLS traffic terminates on one or more server instances and terminating the one-way TLS traffic on the elastic load balancer. In another embodiment, the method involves decrypting a request for the service and forwarding the decrypted request for the service to one or more server instances.

In one aspect, embodiments relate to a method of managing data transmissions. The method includes receiving a request for a first service at a router, wherein the request for the first service originates inside a firewall and the first service executes outside the firewall; receiving a request for a second service at the router, wherein the request for the second service originates inside the firewall and the second service executes outside the firewall; and routing, using the router, communications with the second service through the first service without requiring the firewall to be reconfigured to allow the communications with the second service.

In some embodiments, communications for the first service and the communications for the second service are transport layer security (TLS) communications. In some embodiments, each communication comprises a server name indication (SNI) field, and the SNI field of each communication specifies the second service. In some embodiments, the router is a load balancer. In some embodiments, the communications for the second service are routed without decryption. In some embodiments, the second service is a cloud storage service. In some embodiments, the cloud storage service is specified in either a host header or a URL associated with the request for the second service.

According to another aspect, embodiments relate to a system for managing data transmissions. The system includes an interface for at least receiving: a request for a first service at a router, wherein the request for the first service originates inside a firewall and the first service executes outside the firewall, and a request for a second service at the router, wherein the request for the second service originates inside the firewall and the second service executes outside the firewall; and a router configured to route communications with the second service through the first service without requiring the firewall to be configured to allow the communications with the second service.

In some embodiments, the communications for the first service and the communications for the second service are transport layer security (TLS) communications. In some embodiments, each communication comprises a server name indication (SNI) field, and the SNI field of each communication specifies the second service. According to yet another aspect, embodiments relate to a method for routing communications without requiring firewall configuration. The method includes receiving a transport layer security (TLS) communication at a router, the communication comprising a server name indication (SNI) field, wherein the TLS communication originates inside a firewall and the router is outside the firewall; and routing, using the router, the TLS communication to a destination specified in the SNI field.

In some embodiments, the destination specified refers to a backend service. In some embodiments, the SNI field multiplexes a plurality of platform services via the router. In some embodiments, the TLS communication is routed without decryption. In some embodiments, the destination refers to a cloud storage service. In some embodiments, receiving the TLS communication includes intercepting the TLS communication, and the method further includes validating the cloud storage service.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 14B is a test scenario table 1400B, according to one embodiment of the present disclosure.

Figure 1A:
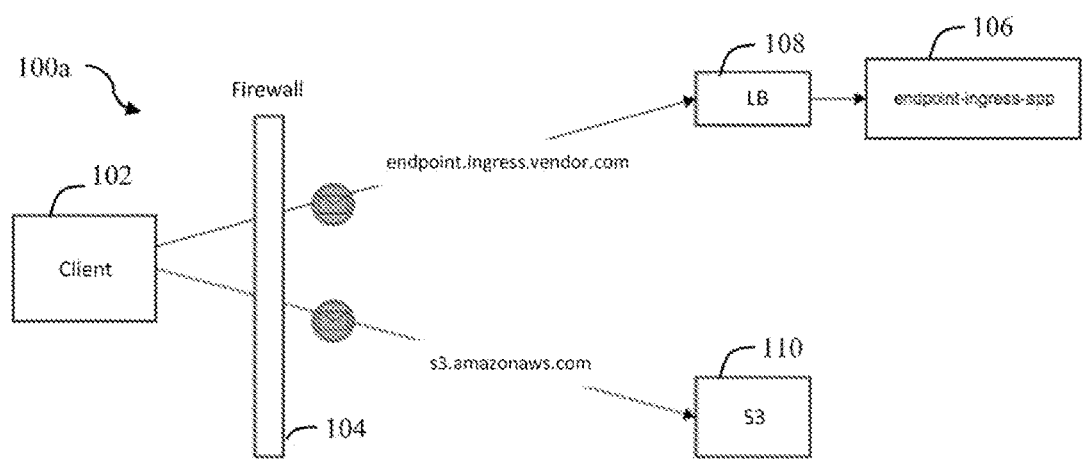
FIGS. 1A and B illustrate exemplary network diagrams in which a client would be required to reconfigure their firewall to accommodate a new service, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Section 1—Example of Secure Multiplexed Routing

Even though servers are typically designated by a single IP address, they may actually be hosting thousands of different domain names. To address this problem, website queries in the 1990s added a host field that tells a server which of the domains that it hosts is the intended recipient for the query. This proved to be an important advance for HTTP. In 2003, Server Name Indication (SNI) was introduced as an extension to the Transport Layer Security (TLS) protocol to allow clients to identify the host they are attempting to connect to as part of the handshake process. Specifically, SNI is a header in the TLS protocol that allows a TLS request to specify the desired host's name. This enables a server to host several websites or services on the same network address or port, akin to a web server that that hosts multiple domains at the same IP address.

In order to provide the name of the server of interest, clients could use an extension of type "server_name" in the initial step of the handshake process. In fact, RFC 3546 recommended that clients include an extension of type "server_name" in the "Client Hello" message whenever they attempt to locate a server by a supported name type. A server that receives a message containing the "server_name" extension may use the data contained in the extension to select the appropriate SSL certificate to return to the client.

As discussed above, clients are at the very least inconvenienced when required by service providers or vendors to reconfigure their firewall. These clients may need to modify their firewall to allow for new or otherwise previously non-allowed endpoints, which are typically defined by a combination of a host name and an IP address. Occasionally, an endpoint is further defined by a port such as a TCP port. To address this problem, Applicant has implemented SNI routing techniques in the realm of data transmission to multiplex multiple platform services via a single routing service. The results are systems and methods that can route new or otherwise previously unconfigured services via an existing backend service.

Embodiments of the present invention achieve another benefit in that the systems and methods described herein know which endpoint (e.g., an API endpoint) is of interest without requiring any decryption of the messages intended for that endpoint. This improves connection security and transmission speed, as the messages can be routed on, e.g., a byte-by-byte basis, without decrypting the messages prior to routing.

Accordingly, the systems and methods described herein may multiplex a plurality of services to multiple endpoints from a single backend service. These techniques may be used for transmitting data to various virtual machines hosted in cloud storage services such as AMAZON S3 and other types of services whether available now or created hereafter.

In a typical client-vendor scenario, a client may be given the following documentation when setting up a vendor product to use some vendor service:

TABLE 1

Vendor Documentation

| Data type | Region | Destination | Port |
|---|---|---|---|
| Agent messages and beacons | United | endpoint.ingress.vendor.com | 443 |
| | Canada | ca.endpoint.ingress.vendor.com | 443 |
| | Europe | eu.endpoint.ingress.vendor.com | 443 |
| | Japan | ap.endpoint.ingress.vendor.com | 443 |
| | Australia | au.endpoint.ingress.vendor.com | 443 |
| Agent file uploads for collection and updated downloads | United States | s3.amazonaws.com | 443 |
| | Canada | s3.ca-central-1.amazonaws.com | 443 |
| | Europe | s3.eu-central-1.amazonaws.com | 443 |
| | Japan | s3.ap-northeast-1.amazonaws.com | 443 |
| | Australia | s3-ap.southeast- | 443 |

The "Agent messages and beacons" data type represent vendor command and control protocols. This data type may specify that an agent beacons periodically, essentially as a check-in. The messages aspect specifies that small messages (e.g., less than 256 KB) can go through this pipeline to specify events, such as when a user logs into their laptop. The "Agent file uploads for collection and update downloads" data type concern larger collections. These may relate to, for example, collecting data specifying applications installed on a device.

Table 1 also includes a list of domain names, where each domain name may be backed by several IP addresses, as well as the involved ports. This data may be relevant for clients when configuring their firewalls to enable them to use the service(s) specified in the "Destination" column. However, a client would therefore have to reconfigure their firewall to open the specified port (i.e., port 443) to allow the service. The "Agent file upload . . ." portion of Table 1 may relate to exemplary cloud storage services (e.g., AMAZON S3). These are endpoints that clients may be hesitant to permit through their firewalls as these hosts may be associated with malware or other malicious software in addition to legitimate software applications and services.

FIG. 1A illustrates an exemplary network diagram 100a based on Table 1, above. Specifically, FIG. 1 illustrates a client 102 behind a firewall 104. In this scenario, the internet targets may be TCP endpoint.ingress.vendor.com:443 and TCP s3.amazonaws.com:443. These endpoints are shown as endpoint-ingress-app 106, which is managed by a load balancer 108, and an S3 endpoint 110. FIG. 1A illustrates the firewall 104 configured to allow both endpoints 106 and 110. However, if the client 102 needs to add a new public facing service known as TCP bootstrap (e.g., at the instruction of a vendor), the client 102 would need to configure a new target permitted through the firewall: TCP boostrap.vendor.com: 443.

Figure 1B:
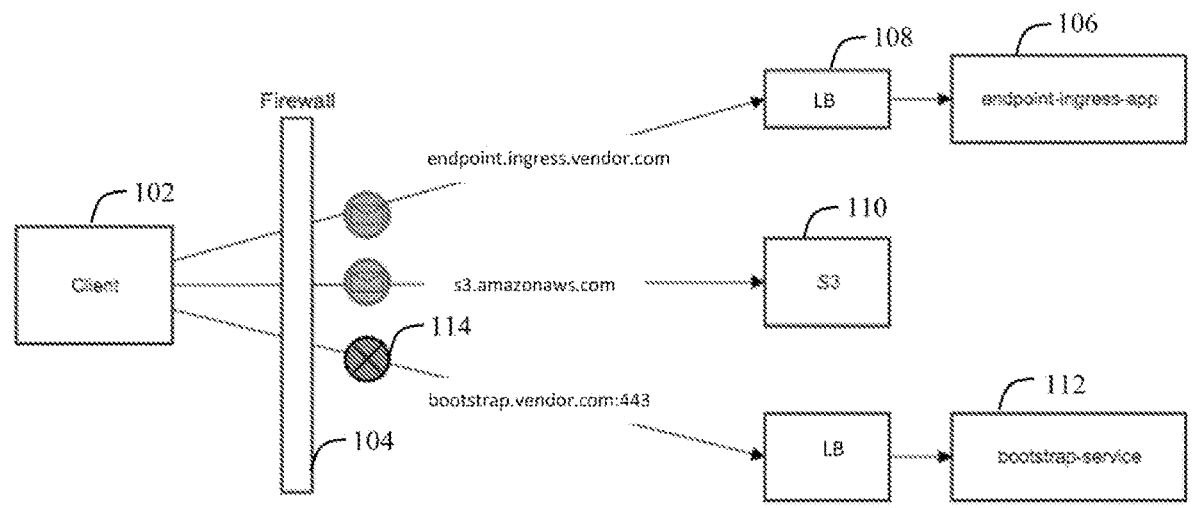

FIG. 1B illustrates an updated network diagram 100b that illustrates this new target. As illustrated, the firewall 104 would have to be updated, as the firewall 104 does not initially allow the bootstrap-service 112 as indicated by "X" 114.

As discussed previously, this may inconvenience both the vendor and the client 102. The vendor would have to, for example, call or email the client 102 to instruct them to update their firewall 104. This is time consuming for the vendor, as the vendor may have to communicate instructions to potentially hundreds of clients.

Additionally, there is no guarantee that the client 102 would receive or actually even read this email, much less follow the instructions. If they fail to review the instructions (or fail to act on the instructions), future services may fail. Even if the client 102 intended to comply with the instructions, they may have to follow certain internal procedures such as submitting a request to their IT department to configure the firewall 104. The client 102 may also have to ensure they comply with any regulatory requirements in adjusting their firewall 104.

Accordingly, the systems and methods described herein overcome these problems by using SNI-based routing techniques to transparently route to a variety of endpoints without modifying any existing code or services. That is, the systems and methods herein do not need to add a particular service to, for example, perform file transfer procedures. Rather, agents can use the SNI header to communicate with the desired service through an SNI-based router.

Figure 2:
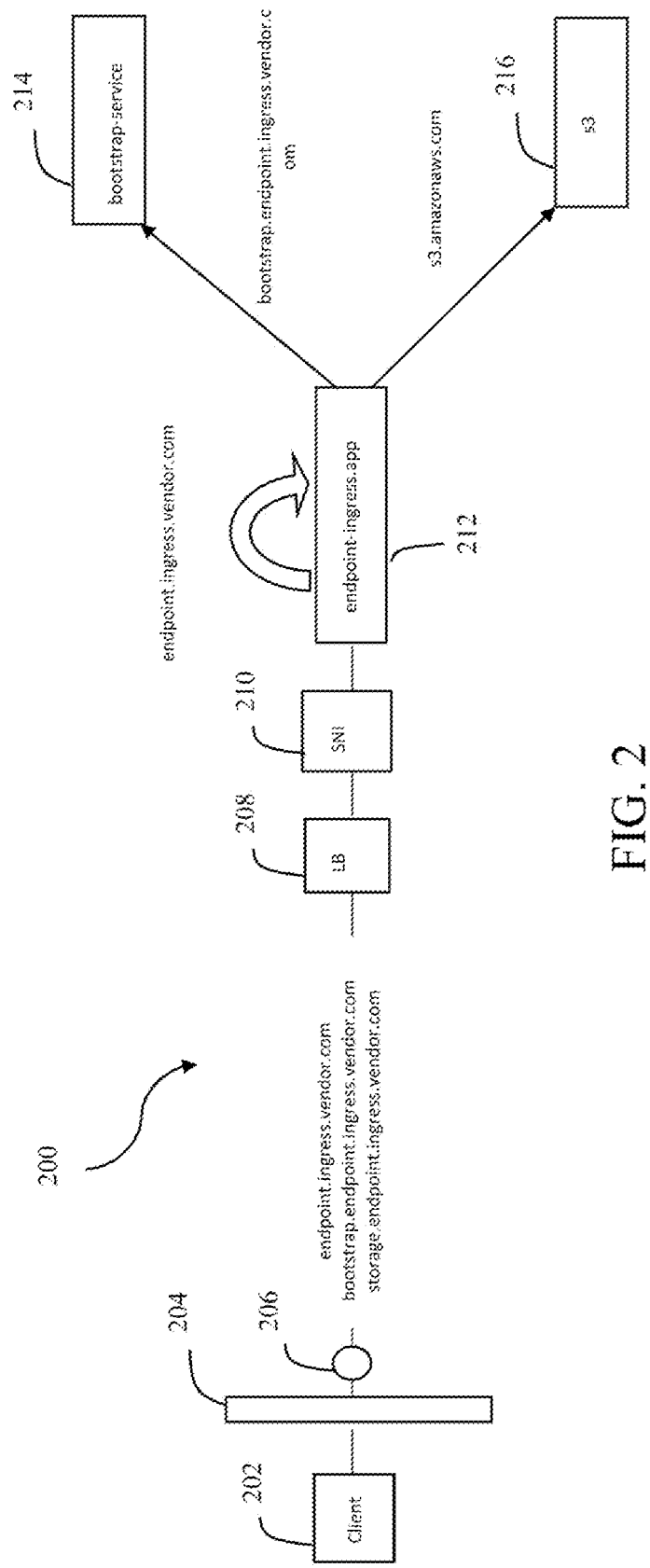
FIG. 2 illustrates an exemplary network diagram, according to one embodiment of the present disclosure.

FIG. 2 illustrates a network diagram 200 in accordance with one embodiment. The network diagram 200 of FIG. 2 addresses the above disadvantages, as the diagram 200 illustrates the use of SNI-routing techniques so that a client does not need to reconfigure their firewall. FIG. 2 illustrates a client 202 in operable connectivity with firewall 204. A data transmission 206 directed to "endpoint.ingress.vendor.com" may specify one of a variety of endpoints such as endpoint.ingress.vendor.com, bootstrap.endpoint.ingress.vendor.com, and storage.endpoint.ingress.vendor.com in one or more fields of the transmission, such as the SNI field discussed above. In reality there may be many more domains to be communicated with through the firewall. The network diagram also shows a load balancer 208 and an SNI router 210. The endpoint-ingress.app 212 may execute on SNI router 210 and process inbound communications. The self-directing arrow indicates that this endpoint 212 can service requests to "endpoint.ingress" and that no routing has to occur. In other words, any SNI extension or header addressing "endpoint.ingress" is received and serviced by this endpoint 212.

FIG. 2 also shows the bootstrap-service 214 and the S3 service 216 in communication with the endpoint-ingress.app 212. The endpoint-ingress.app 212 is configured to route messages designating these services to these endpoints. Because endpoint.ingress.vendor.com and bootstrap.endpoint.ingress.vendor.com share the same load balancer 208, those DNS records will resolve to the same IPs. Accordingly, customers need not update their firewall rules to permit communications with bootstrap.endpoint.ingress.vendor.com, as communications to endpoint.ingress designating bootstrap in the SNI field will be processed by the router 210 and forwarded to bootstrap-service 214.

Figure 3:
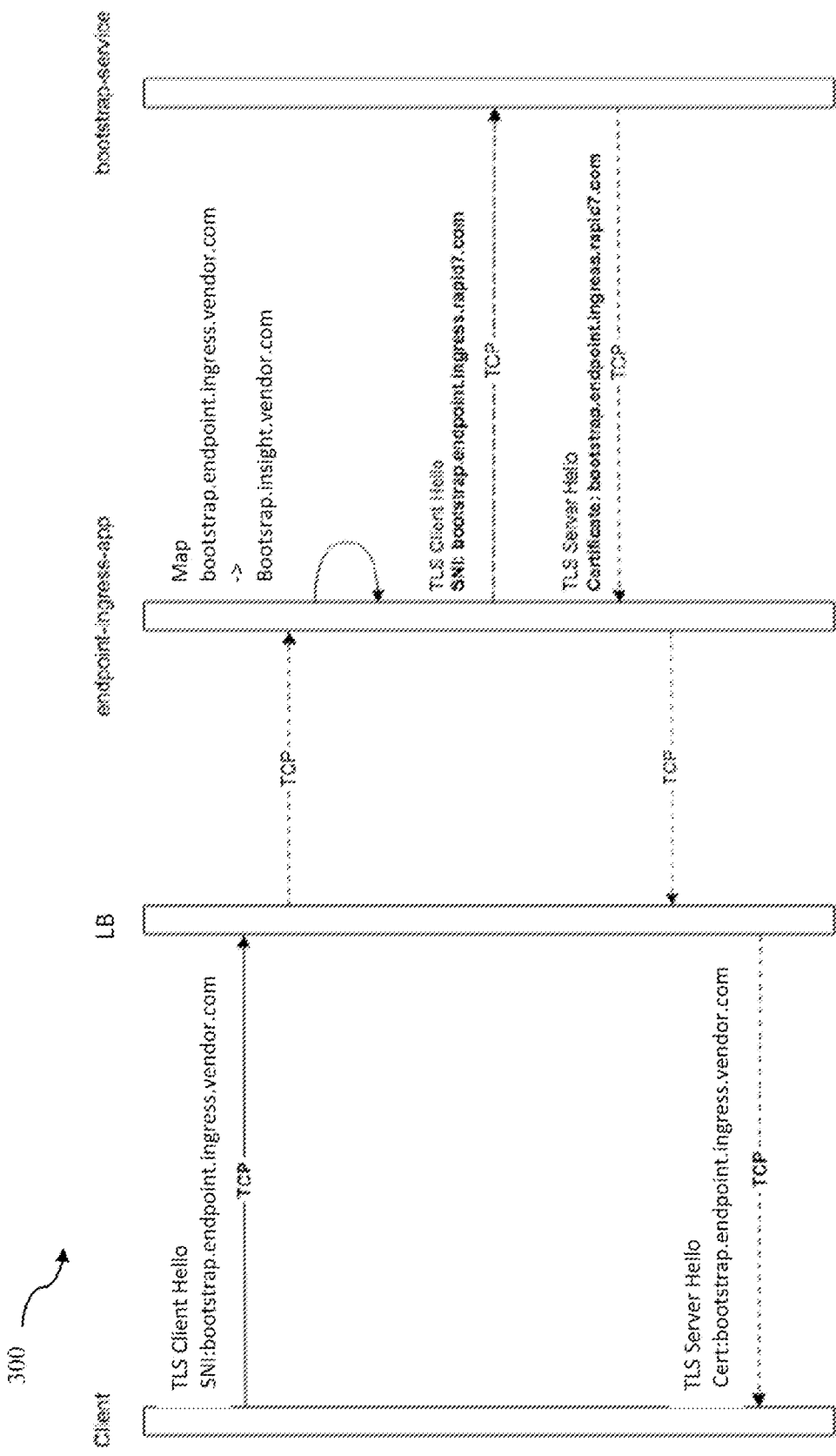
FIG. 3 illustrates an exemplary handshake process related to the diagram of FIG. 2, according to one embodiment of the present disclosure.

FIG. 3 illustrates an exemplary handshake process 300 related to the diagram 200 of FIG. 2. First, a message comes in from a client (e.g., "Client Hello" to endpoint-ingress designating "bootstrap.endpoint.ingress.vendor.com" for communication) and is communicated to the load balancer (LB). In this case, bootsrap.endpoint.ingress.vendor.com is the inbound SNI header value. The LB then establishes a TCP connection to endpoint-ingress-app, which consults a map file to determine how to direct the inbound communication. For example, the map file may specify a service for receiving the message given a particular designated domain. This routing may utilize DNS.

As seen in FIG. 3, bootstrap.endpoint.ingress.vendor may be mapped to bootstrap.insight.vendor.com by endpoint-ingress-app, which then forwards the TLS Client Hello originating with the client to the bootstrap-service at boostrap.endpoint.ingress.rapid7.com. The bootstrap-service may receive the communication and, in response, provide the certificate for bootstrap.endpoint.ingress.vendor.com in a TLS Hello message. As can be deduced from the above discussion and FIG. 3, endpoint-ingress-app does not provide a response but only acts as a router. However, the returned certificate via endpoint-ingress-app is for bootsrap.endpoint.ingress.vendor.com, which is what the client originally requested.

As discussed above, clients are often hesitant to allow their firewalls to accommodate third party cloud storage services without restrictions. This often is because cloud storage services are associated with or otherwise enable the spread of malware or other malicious software. Specifically, cloud storage services are often leveraged by threat actors as a data storage medium, thereby allowing the cheap and fast uploading of sensitive user data from compromised computers.

Some product vendors may be invested in the use of these cloud storage services, however, and are therefore hesitant to stop using them entirely. These product vendors ensure that only their designated buckets can be leveraged and then rely on the buckets' access control lists to ensure proper security.

Figure 4:
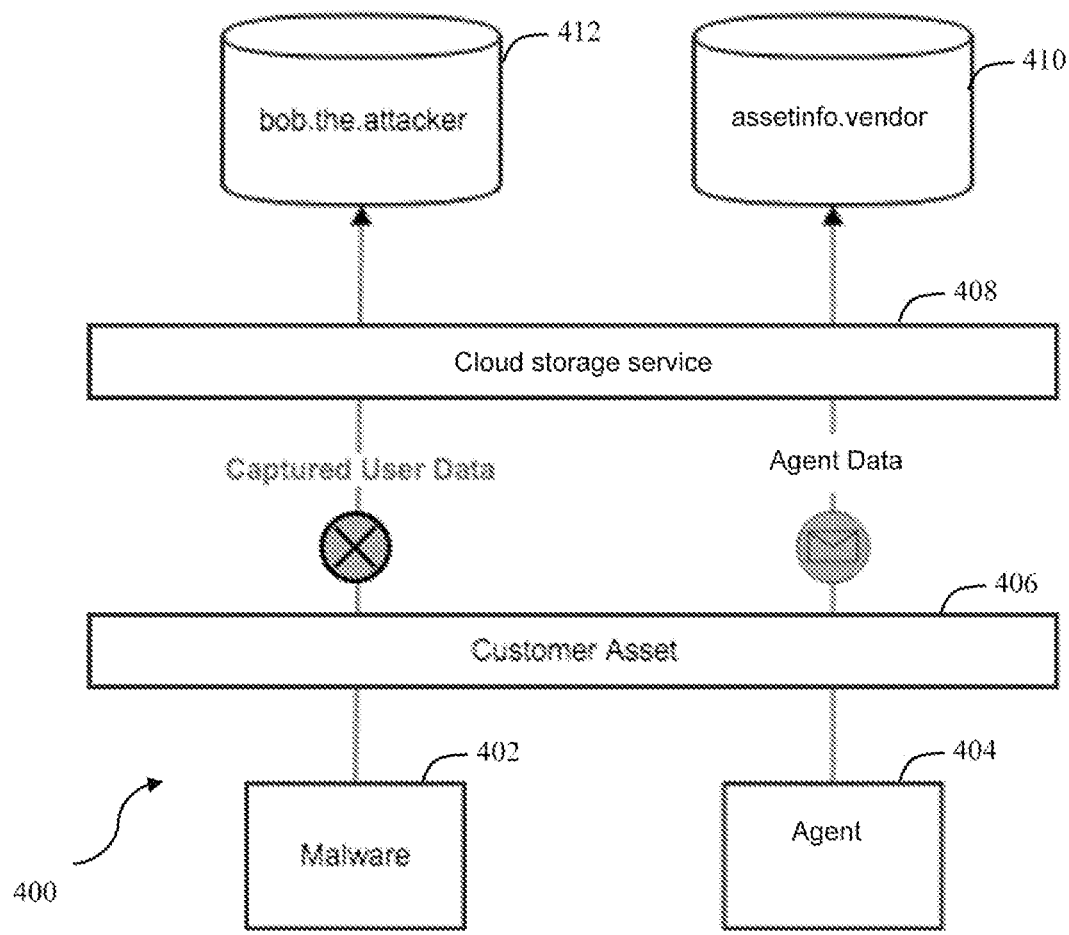
FIG. 4 illustrates an exemplary network diagram indicating potential security flaws associated with existing network configurations, according to one embodiment of the present disclosure.

This potential security problem is illustrated in FIG. 4. Network diagram 400 illustrates both malware 402 and a legitimate agent 404 executing on a customer asset 406. That malware 402 may, for example, gather sensitive information related to one or more users associated with the customer. Similarly, the agent 404 may be authorized to gather certain agent data from the customer asset 406, and store this data on a cloud storage service 408 for later retrieval by vendor 410. If a customer wanted to use the agent 404, they would have to whitelist the cloud storage service 408. Having done so, malware 402 could also access the cloud storage service 408 through the customer's firewall and other measures, storing information for later retrieval by the attacker 412. The systems and methods described herein overcome this problem by intercepting client-side requests to the cloud storage service, validating (or rejecting) the requested bucket within the cloud storage service, and thus ensuring that only pre-approved buckets can be requested. The systems and methods described herein may use a host header or URL segment to specify the bucket and an intermediary to decode the request before routing and thereby facilitating the connection.

Figure 5:
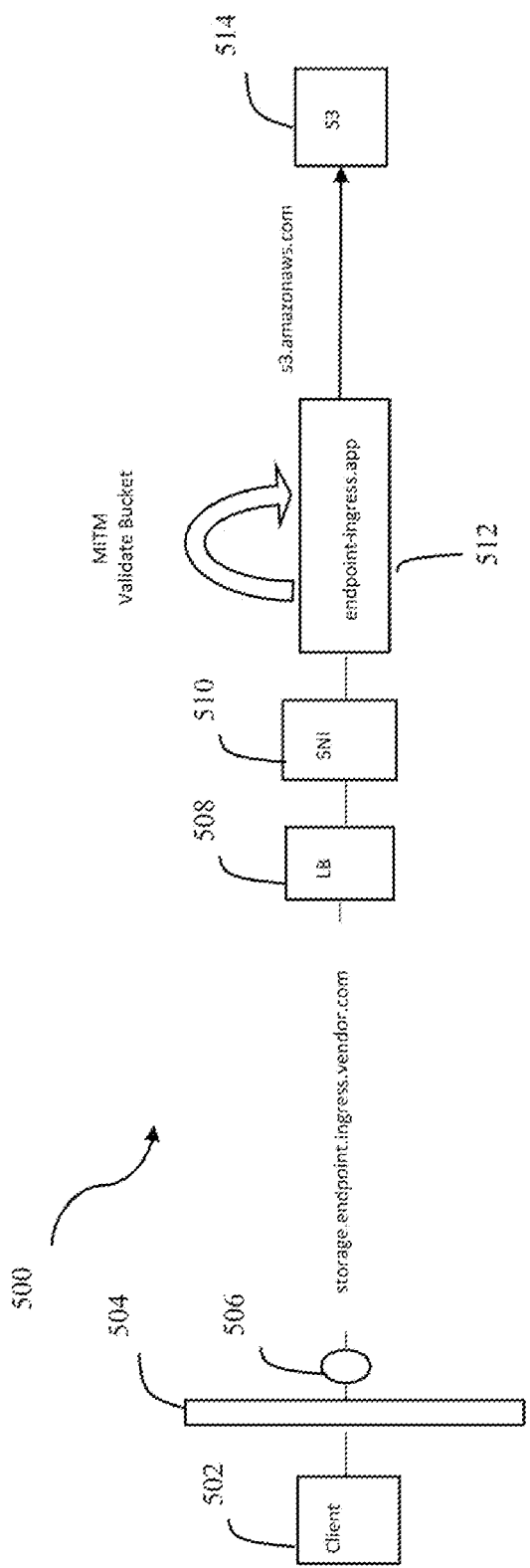
FIG. 5 illustrates a proxying workflow to address the potential security flaws of FIG. 4, according to one embodiment of the present disclosure.

FIG. 5 illustrates a proxying workflow 500 in accordance with one embodiment. Specifically, FIG. 5 illustrates a workflow 500 using S3 proxying. As in previous figures, FIG. 5 illustrates a client 502 in operable connectivity with a firewall 504, a transmitted message 506, load balancer 508, and an SNI-based router 510. From the client's perspective, they issue a request to https://storage.endpoint.ingress.vendor.com. That is, they would not issue a request to https://s3.amazonaws.com.

Therefore, the client 502 would not observe or need to permit traffic to the S3 service 514. After handling by the load balancer 508, the SNI router 510 receives the request and parses the SNI header in the request to identify that the client 502 wants to communicate with storage.endpoint.ingress.vendor.com, and maps this domain to endpoint-ingress.app 512. Endpoint-ingress app 512 in turn routes this communication to S3 service 514 for storage after validating the bucket.

Figure 6:
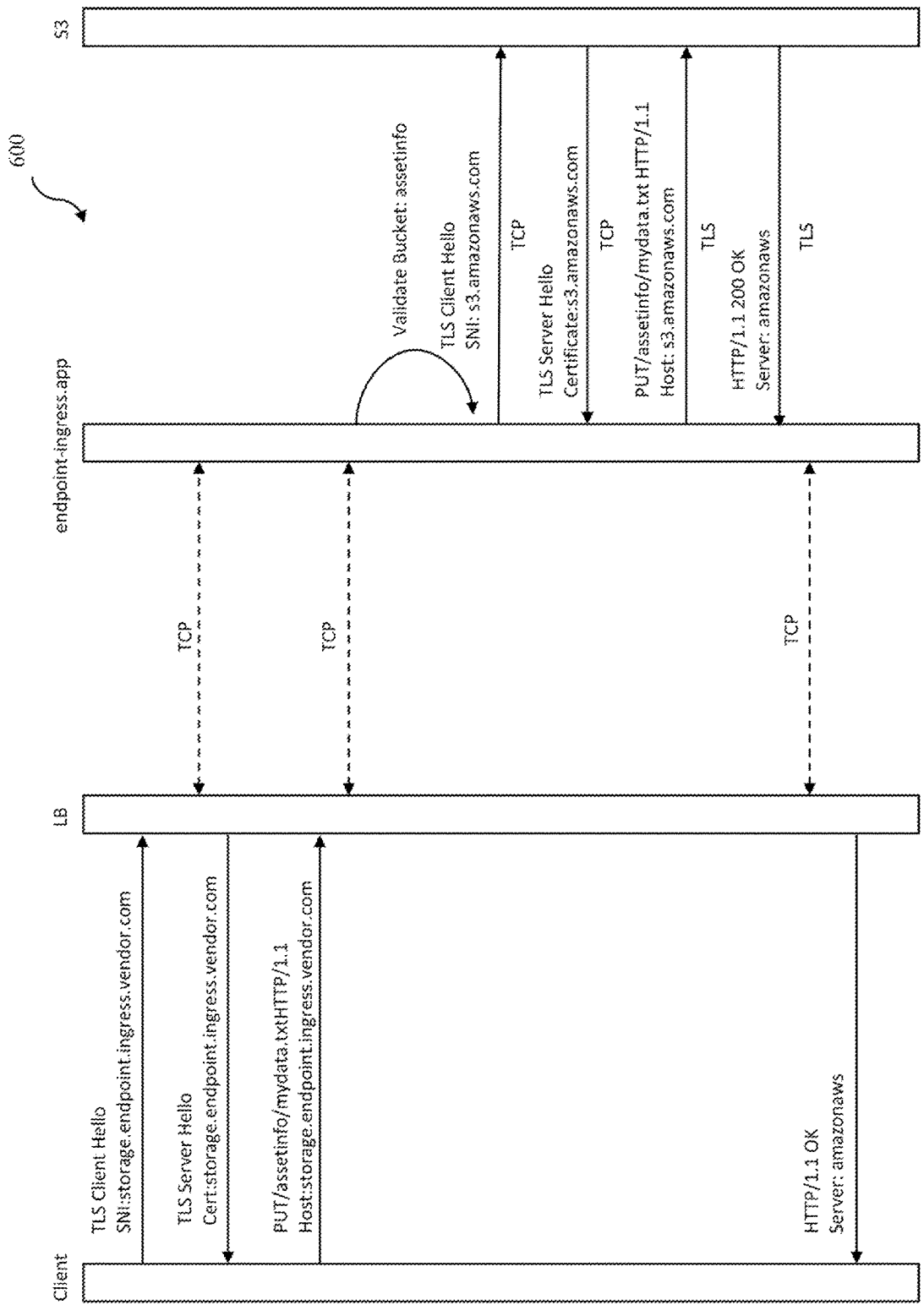
FIG. 6 illustrates an exemplary handshake process associated with the proxying workflow of FIG. 5, according to one embodiment of the present disclosure.

FIG. 6 illustrates an exemplary handshake process 600 corresponding to the proxying workflow 500 of FIG. 5 in accordance with one embodiment. That is, this handshake process 600 begins with a client message or request that specifies storage.endpoint.ingress.vendor.com in the SNI header. The load balancer then establishes a TCP connection with endpoint-ingress.app, which validates the appropriate bucket associated with the vendor and returns the SSL certificate for the bucket associated with the requested host in the TLS Server Hello message.

Subsequent PUT commands transmits data for storage in the cloud. Endpoint-ingress.app receives these transmissions from the client via the load balancer, and then performs the bucket validation step to ensure that only vendor-approved buckets are requested. The S3 service can respond and provide the appropriate certificate for s3.amazonaws.com) which is used by endpoint-ingress.app to store data in S3.

Figure 7:
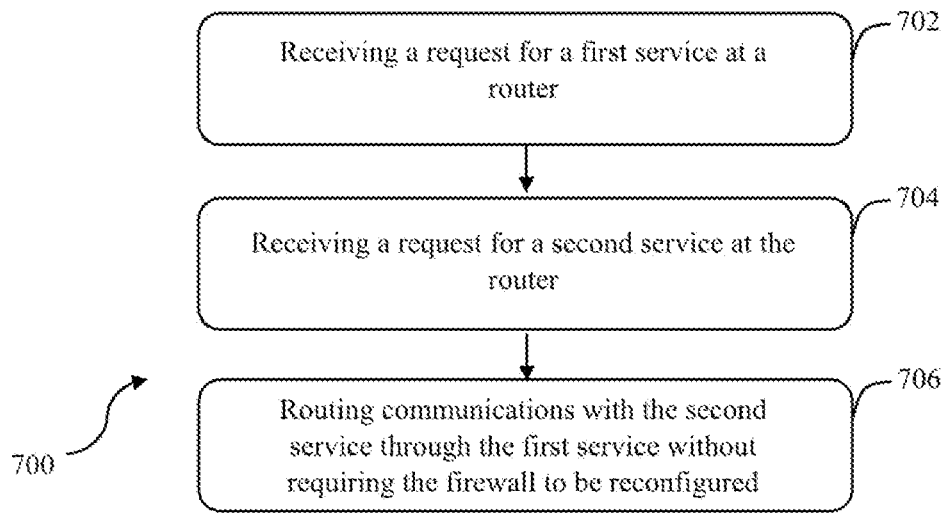
FIG. 7 depicts a flowchart of a method of managing data transmissions, according to one embodiment of the present disclosure.

FIG. 7 depicts a flowchart of a method 700 of managing data transmissions in accordance with one embodiment. Step 702 involves receiving a request for a first service at a router, wherein the request for the first service originates inside a firewall and the first service executes outside the firewall. Step 704 involves receiving a request for a second service at the router, wherein the request for the second service originates inside the firewall and the second service executes outside the firewall. In some embodiments, the second service may be a cloud storage service. The cloud storage may be specified in either a host header or a URL associated with the request for the second service.

Step 706 involves routing, using the router, communications with the second service through the first service without requiring the firewall to be reconfigured to allow the communications with the second service. The communications for the first service and the communications for the second service may be transport layer security communications, for example. As discussed above, each of these communications may comprise an SNI field, and the SNI field of each communication may specify the second service although the communications themselves are addressed to the first service. The routing may include byte-by-byte routing. That is, the routing may be done without decryption.

Figure 8:
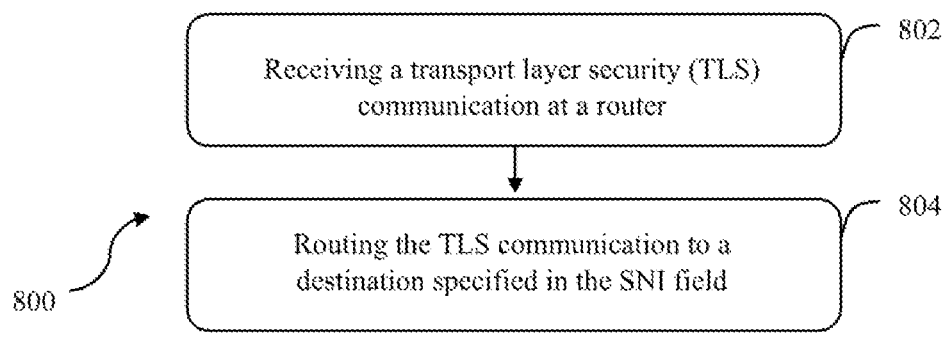
FIG. 8 depicts a flowchart of a method for routing communications without requiring firewall configuration, according to one embodiment of the present disclosure.

FIG. 8 depicts a flowchart of a method 800 for routing communications without requiring firewall configuration in accordance with one embodiment. Step 802 involves receiving a transport layer security (TLS) communication at a router, the communication comprising a server name indication (SNI) field, wherein the TLS communication originates inside a firewall and the router is outside the firewall. In some embodiments, receiving the TLS communication may involve intercepting the TLS communication.

In these situations, the method may further include validating the service (e.g., a cloud storage service). Step 804 involves routing, using the router, the TLS communication to a destination specified in the SNI field. The specified destination may refer to a backend service or a cloud storage service, for example. In some embodiments, the SNI field may multiplex a plurality of platform services via the router. As in method 700, the TLS communication may be routed using byte-by-byte routing. That is, the TLS communication may be routed without decryption.

Section 2

Example of Single Whitelisted Ingress Endpoint on 1 & 2 Way TLS Connections

Modern centralized cloud-based cybersecurity platforms (e.g., a cloud platform like the Insight Platform provided by Rapid7®, Inc. of Boston, Mass.) can deploy agents for data collection and analysis (DCA) purposes. An agent is lightweight software that can be installed on various supported computing assets in the cloud or on-premises to centralize and monitor data. The agent provides endpoint visibility and detection by collecting live system information (e.g., computing asset identification information, running processes, and logs) from computing assets and sends this data back to the cloud platform for analysis.

As noted, deployments of agents require proper connectivity to function. For example, customers require whitelisting rules to configure on their computing assets so that their corresponding agents can communicate with the cloud platform. Unfortunately, also as noted, network load balancing (NLB) on transport layer security (TLS) connections greatly increases networking setup complexity for customers of the cloud platform. For example, customers of the cloud platform described above (and other comparable cloud platforms) often require at least the following three technical steps, which must happen in tandem: (1) a single internet protocol (IP) port whitelisting rule for the customer to setup that does not need changes or updates, (2) handling of both one-way and two-way transport layer security (TLS) connections, and (3) termination of the one-way TLS connection on a load balancer (e.g., for cost efficiency).

First, it is extremely cumbersome and resource and cost prohibitive to require customers of the cloud platform described above (and other comparable cloud platforms) to use multiple whitelisting rules and/or to require customers to change and/or update existing whitelisting rules. Customers typically prefer using a single whitelisting rule (that will not need to be changed and/or updated) to receive and route data from multiple endpoints (e.g., to/from multiple vendors, cloud storage providers, agents, and the like) because doing so greatly simplifies networking setup complexity and reduces computing resource consumption. Using a single whitelisting rule in a centralized cloud cybersecurity computing environment means adopting the single whitelisting rule to be readily applicable to various disparate endpoint destinations (e.g., in the cloud such as Amazon® S3) and data collection destinations (e.g., agents).

Second, the cloud platform must be able to handle both one-way and two-way TLS connections. TLS and its predecessor, SSL (secure sockets layer), are cryptographic protocols to facilitate communication security (e.g., confidentiality, integrity, non-repudiation, and the like), over a network. In one-way TLS, a server certificate is created by a certificate authority (CA) that a client can trust when the clients wants to connect to a server. A server can be configured to allow connections from any client (e.g., like in one-way TLS) or the server can be configured to request authentication from any client that attempts to connect to the server. In two-way TLS authentication, a client certificate is involved in addition to the server certificate for bolstering the authentication process. Just like a server certificate, a client certificate includes basic information about the client's identity, a public key of the client, and a digital signature of a CA.

Certain applications use one-way TLS and others require two-way TLS. For example, accessing an electronic mail service (e.g., Gmail) uses one-way TLS (e.g., by the use of a password for login). Two-way TLS connections are preferred in scenarios where a server is configured to only accept TLS connections from a limited group of permitted clients (e.g., when a customer wants to limit TLS connections to a server to certain vendors or partners). Whitelisting alone is not a good security practice, as the IP can be spoofed. Therefore, two-way TLS in addition to a single whitelisting rule is a preferred implementation mechanism for many customers.

In the cloud platform disclosed and described herein, one-way TLS traffic can include several external endpoints routinely encountered (and required) by the cloud platform (e.g., hypertext transfer protocol (HTTP) traffic, connections to cloud-based object storage such as S3, and the like). On the other hand, agent-based traffic requires two-way TLS connections given the highly sensitive and confidential nature of agent-collected data (e.g., data in the cybersecurity realm such as user information, asset identity, running processes, log data, and the like). Therefore, the cloud platform must be configured to route both one-way and two-way TLS connections.

Third, the cloud platform must be able to perform load balancing (e.g., for cost efficiency purposes). For example, in addition to implementing a network load balancer that distributes incoming one-way and two-way TLS traffic across multiple targets, the cloud platform must be able to selectively terminate only the one-way TLS connection on a different load balancer (e.g., an elastic load balancer for the one-way TLS connection).

Disclosed herein are methods, systems, and processes that securely facilitate the provision and configuration of a single whitelisted ingress endpoint on both one-way and two-way TLS connections that at least: (a) uses a single whitelisting rule (that does not need changes/updates), (b) handles both one-way and two-way TLS connections, and (c) selectively terminates the one-way TLS connection on a load balancer for cost efficiency.

Example of Existing Ingress Endpoint Implementation(s)

Figure 9:
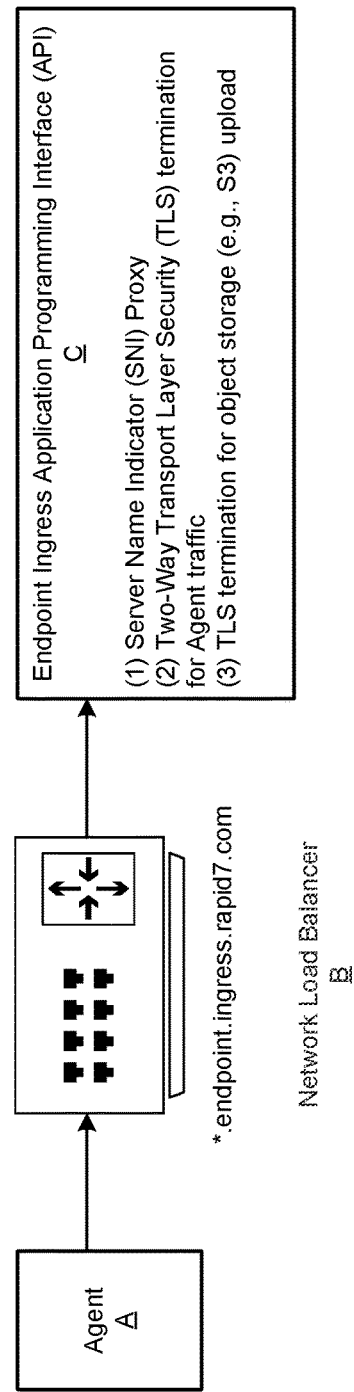
FIG. 9 is a block diagram 900 of an existing and/or traditional implementation of a whitelisted ingress endpoint and is prior art.

FIG. 9 is a block diagram 900 of an existing implementation of a whitelisted ingress endpoint. In existing and/or traditional implementations of a whitelist ingress endpoint, a service request received by (or routed to) network load balancer B from a target data source (e.g., Agent A) is shown as transfer control protocol (TCP) endpoint.ingress.rapid7.com in FIG. 9. An endpoint ingress application programming interface (API) C, as shown in FIG. 9, currently handles: (1) the server name indication (SNI) proxy, (2) two-way TLS termination for agent traffic, and (3) TLS termination for object storage upload (e.g., S3).

Unfortunately, the existing implementation depicted in FIG. 9 (and another similar and/or comparable implementation) requires at least: (1) multiple whitelisting rules (e.g., one whitelisting rule for two-way TLS agent traffic and another whitelisting rule for one-way TLS S3 traffic), (2) cannot simultaneously handle both one-way and two-way TLS connections (e.g., for selective load balancing purposes), and (3) is unable to selectively terminate just the one-way TLS on a load balancer for cost efficiency (e.g., at least because of the inability to identify and segregate one-way and two-way TLS connections in a multiplexed TLS connection).

Example Platform Gateway Service for Single Whitelisted Ingress Endpoint

Figure 10:
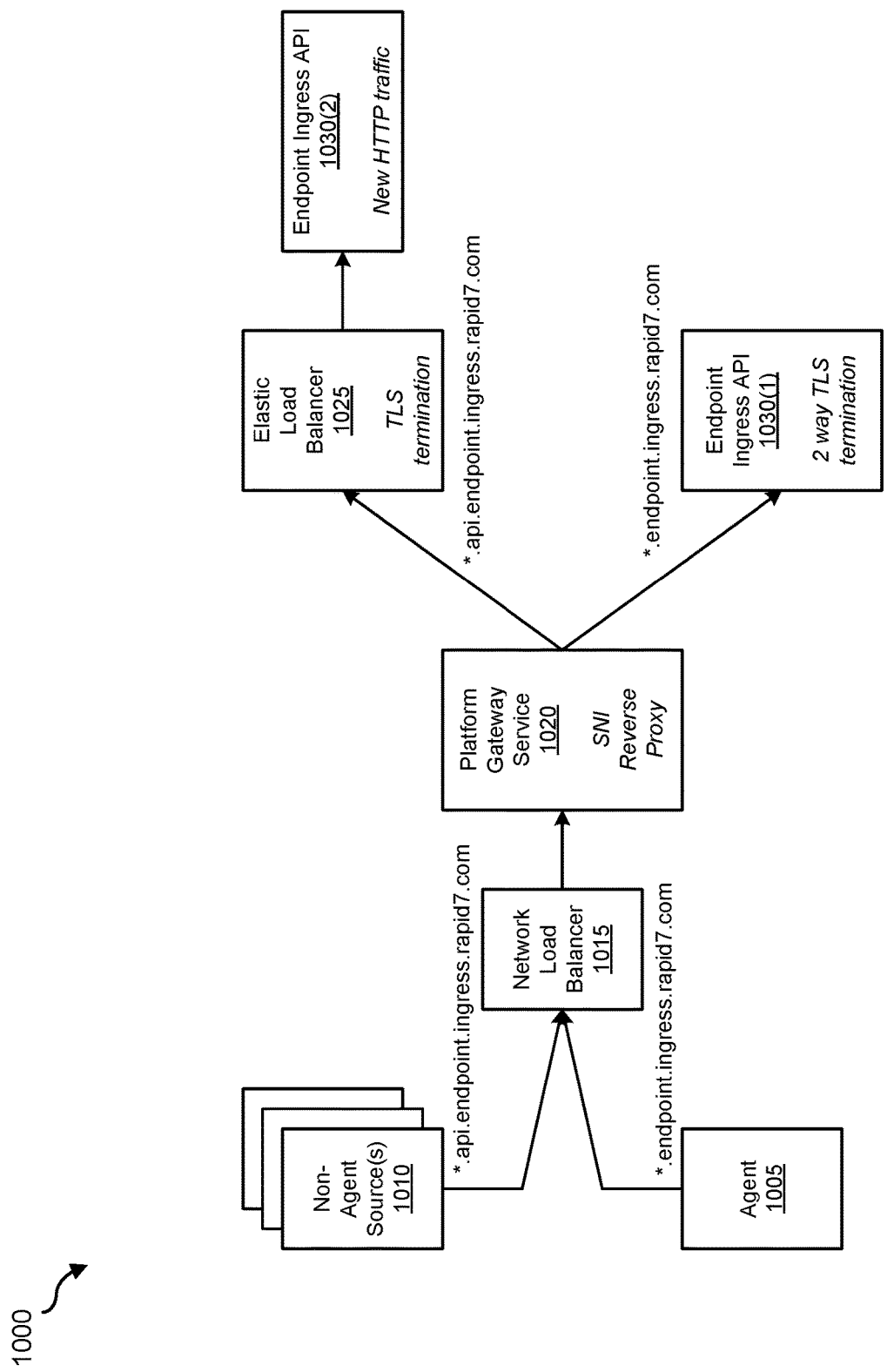
FIG. 10 is a block diagram 1000 of a single whitelisted ingress endpoint implemented on 1 & 2 way TLS connections, according to one embodiment of the present disclosure.

FIG. 10 is a block diagram 1000 of a single whitelisted ingress endpoint implemented on one-way and two-way TLS connections, according to one embodiment. Internet/TCP target service destinations that are routed are indicated as endpoint.ingress.rapid.com for agent 1005 and api.endpoint.ingress.rapid7.com for non-agent source(s) 1010 (e.g., S3 and other vendors). In one embodiment, platform gateway service 1020 configures network load balancer 1015 to implement SNI routing techniques to multiplex multiple platform services (e.g., agent 1005 and non-agent sources 1010) via a single routing service (as disclosed in application Ser. No. 16/558,485).

SNI is a header in the TLS protocol (e.g., a TLS header) that permits a TLS request to specify a desired host's name. This enables a server to host several websites or services on the same network address or port. As noted, customers are inconvenienced when required by the cloud platform to reconfigure their whitelisting rules or use multiple whitelisting rules (e.g., as part of a firewall as discussed with respect to application Ser. No. 16/558,485). Therefore, to later segregate or separate out one-way TLS traffic for selective termination, the system of FIG. 10 includes network load balancer 1015, a platform gateway service 1020 that acts as a SNI reverse proxy, an elastic load balancer 1025 (for one-way TLS termination), and endpoint ingress APIs (e.g., various server instances for new HTTP traffic and two-way TLS termination).

In one embodiment, a request from agent 1005 (e.g., agent-based network traffic) and non-agent source(s) 1010 (e.g., non-agent-based network traffic) is routed to network load balancer 1015 using a single whitelisting rule. For example, in order for the customer to be able to use just a single whitelisting rule, a domain name system (DNS) record is used to route both agent-based network traffic and non-agent-based network traffic to network load balancer 1015. As described in application Ser. No. 16/558,485, the two-way TLS agent-based network traffic and the one-way TLS non-agent-based network traffic can be multiplexed and transmitted to platform gateway service 1020 from network load balancer 1015 (as shown in FIG. 10).

In certain embodiments, platform gateway service 1020 separates out (or segregates) the non-agent-based network traffic (e.g., the one-way TLS traffic) from the agent-based network traffic (e.g., the two-way TLS traffic). Because agent 1005 is managed by platform gateway service 1020, platform gateway service 1020 can analyze a TLS header in the routed TLS connection to determine which portion of the TLS connection is one-way TLS traffic and which portion of the TLS connection is two-way TLS traffic. For example, platform gateway service 1020 separates out the one-way TLS traffic by tunneling (e.g., using a tunneling protocol) the TLS connection from network load balancer 1015 to an SNI reverse proxy (e.g., provided by platform gateway service 1020) based on one or more SNI fields in a TLS header of the TLS connection. Therefore, because platform gateway service 1020 acts as a SNI reverse proxy, platform gateway service 1020 can determine whether a service routed to network load balancer 1015 is one-way TLS traffic or two-way TLS traffic based on the TLS header of the (multiplexed) TLS connection (where the TLS header is shared by both the one-way and two-way TLS connections).

Finally, in some embodiments, once separated out, segregated, or separately identified by gateway platform service 1020, the one-way TLS traffic (e.g., the non-agent-based network traffic) is terminated on elastic load balancer 1025. In other embodiments, the two-way TLS traffic (e.g., the agent-based network traffic) is terminated on endpoint ingress API 1030(1) and endpoint ingress API 1030(2) accepts new HTTP traffic. For example, the two-way TLS traffic is terminated on one or more server instances, the one-way TLS traffic is terminated on elastic load balancer 1025, and a request for the service is decrypted and forwarded to one or more server instances.

Example Command and Control Mechanism for Ingress Endpoint(s)

Figure 11:
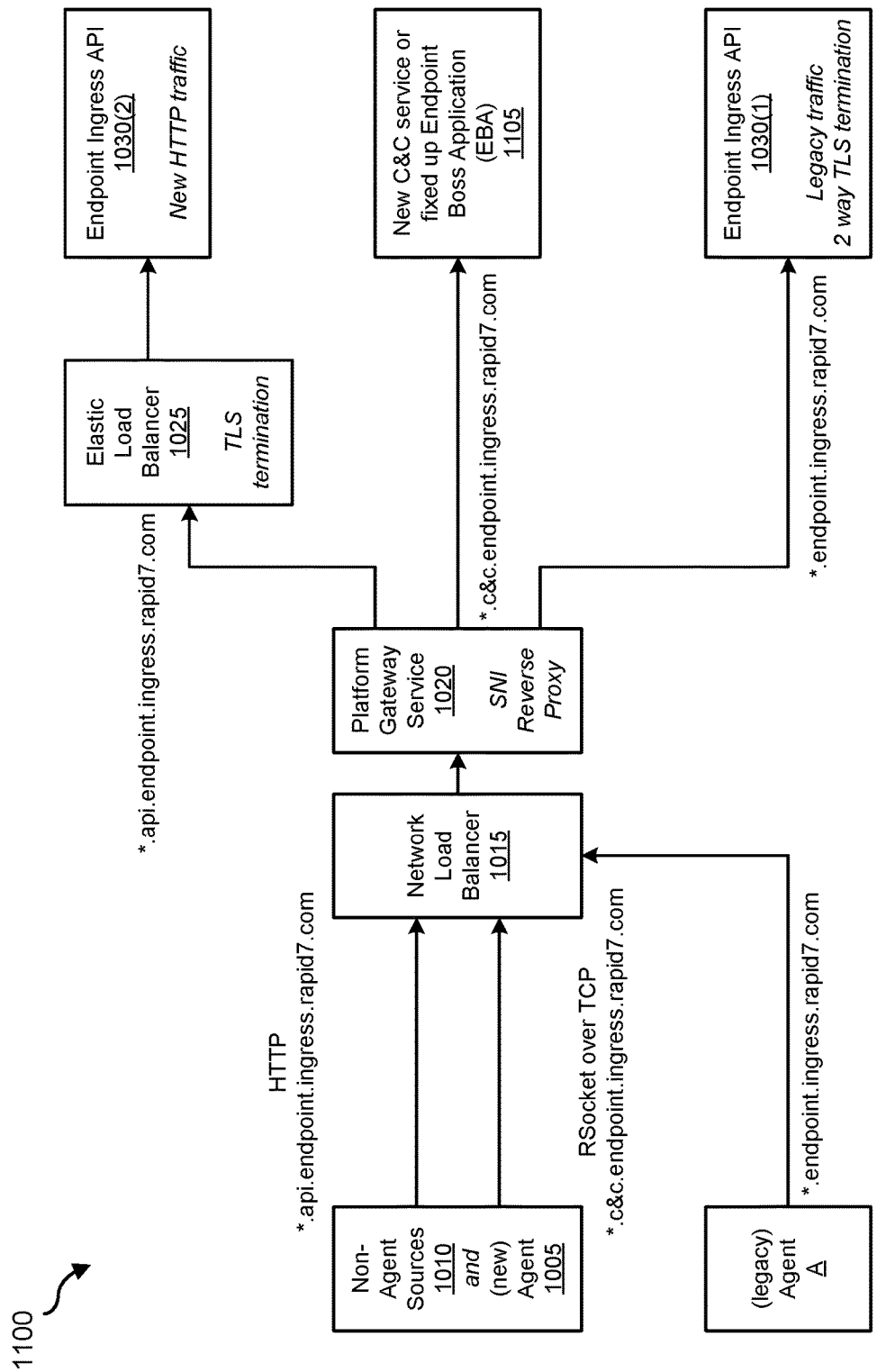
FIG. 11 is a block diagram 1100 of the system of FIG. 10 augmented with a command and control mechanism, according to one embodiment of the present disclosure.

FIG. 11 is a block diagram 1100 of the system of FIG. 10 augmented with a command and control mechanism for endpoints, according to one embodiment. As shown in FIG. 11, both one-way TLS traffic (e.g., from (new) agent 1005 that is an endpoint with a built-in command and control mechanism (that does away with the need for two-way TLS in agent deployments) and non-agent sources 1010) and two-way TLS traffic (e.g., from (legacy) agent A) is routed to network load balancer 1015. Next, a multiplexed TLS connection (with one-way and two-way TLS connections from the aforementioned endpoints) is received by platform gateway service 1020, which functions as a SNI reverse proxy (e.g., by tunneling the TLS connection to downstream services like a reverse proxy).

Platform gateway service 1020 identifies and separates out the various one-way and two-way TLS connections in the multiplexed TLS connection based on at least a TLS header that is shared by the three TLS connections shown in FIG. 11. The one-way TLS traffic from non-agent sources 1010 endpoint is terminated at elastic load balancer 1025, TLS traffic (one-way or two-way) from (new) agent 1005 is handled by a new command and control service or a re-configured endpoint boss application (EBA), and the two-way TLS traffic from (legacy) agent A endpoint is terminated by endpoint ingress API 1030(1) (e.g., legacy traffic two-way TLS termination).

The network design(s) illustrated in FIGS. 10 and 11 include multiple load balancers (e.g., network load balancer 1015 and elastic load balancer 1025) that work together seamlessly to enable the cloud platform to expose various platform services (e.g., agent-based and non-agent-based endpoints) for both one-way and two-way TLS connections through a single IP endpoint for customers to whitelist, thus greatly simplifying networking setup complexity.

As noted, currently it is not possible to satisfy all three technical requirements of a single whitelisted IP endpoint, one-way and two-way TLS connection handling, and selective termination of one-way TLS traffic on a load balancer. By leveraging systems, methods, and processes for "Secure Multiplexed Routing" disclosed in application Ser. No. 16/558,485 along with the identification/determination of which endpoint services are one-way or two-way TLS connections, the systems and methods disclosed herein can identify and separate disparate TLS connections accordingly as well as terminate two-way TLS connections on server instances and terminate one-way TLS connections on load balancers (which can then forward the decrypted requests to the server instances (e.g., endpoint ingress APIs)).

Example Process to Implement a Platform Gateway Service

Figure 12:
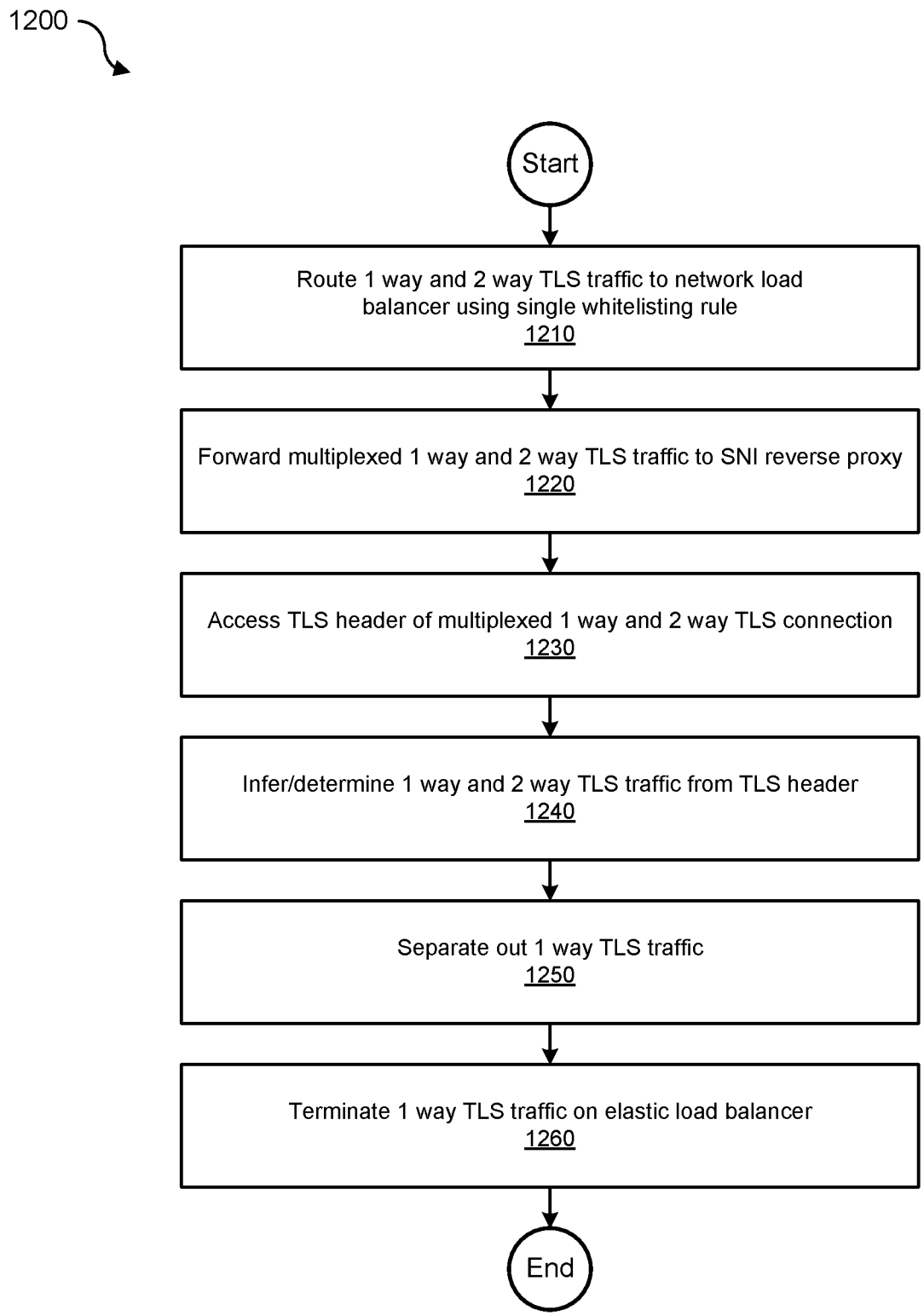
FIG. 12 is a flowchart 1200 of a process for securely implementing a single whitelisted ingress endpoint on one-way and two-way TLS connections, according to one embodiment of the present disclosure.

FIG. 12 is a flowchart 1200 of a process for securely implementing a single whitelisted ingress endpoint on one-way and two-way TLS connections, according to one embodiment. The process begins at 1210 by routing one-way and two-way TLS traffic to a network load balancer (e.g., network load balancer 1015) using a single whitelisting rule, thus enabling the exposure of both one-way and two-way platform services (e.g., agent endpoint traffic and non-agent endpoint traffic) through a single IP endpoint for customers to whitelist (e.g., network load balancer 1015 and/or platform gateway service 1020—in some embodiments, platform gateway service 1020 can include network load balancer 1015). At 1220, the process forwards the multiplexed one-way and two-way TLS traffic to a SNI reverse proxy as a single TLS connection (e.g., platform gateway service 220). At 1230, the process accesses a TLS header of the TLS connection that includes both the one-way and two-way TLS traffic (e.g., a shared TLS header).

At 1240, the process infers and/or determines the one-way and two-way TLS traffic from the (shared) TLS header. For example, because agent 1005 is managed by the same cloud platform that also manages platform gateway service 1020, the SNI reverse proxy can determine which portion of the multiplexed TLS connection is one-way TLS traffic and which portion of the multiplexed TLS is two-way TLS traffic. At 1250, the process separates out the one-way TLS traffic (from the single TLS connection). In some embodiments, the TLS connection can be demultiplexed by platform gateway service 220. The process ends at 1260 by terminating the one-way TLS traffic on an elastic load balancer (e.g., elastic load balancer 1025).

Section 3—Pinging Servers by Leveraging TLS Protocol

To provide optimal performance and customer experience, the Insight Agent (or simply, "agent") provided by Rapid7®, Inc. of Boston, Mass. includes a smart connection mode capability where the agent uses a proprietary ping protocol through Transmission Control Protocol (TCP) to one or more servers, and selects an optimal server by comparing the Round Trip Time (RTT) of the pings. The ping is proprietary and on the same port as the communication port to ensure that customers only need minimal networking setup. The foregoing setup and configuration works on certain setups, but on certain customer networks, proxies, or other network intermediaries that support protocol detection, issues arise with parsing the proprietary ping causing packets to hang, resulting in delays and eventual failure of the ping. Therefore, the methods, systems, and processes described herein disclose a novel method of pinging servers that satisfies at least the following: (a) does not need extra port whitelisting for customers to setup and (b) does not cause problems with network intermediaries that support protocol detection.

Figure 13:
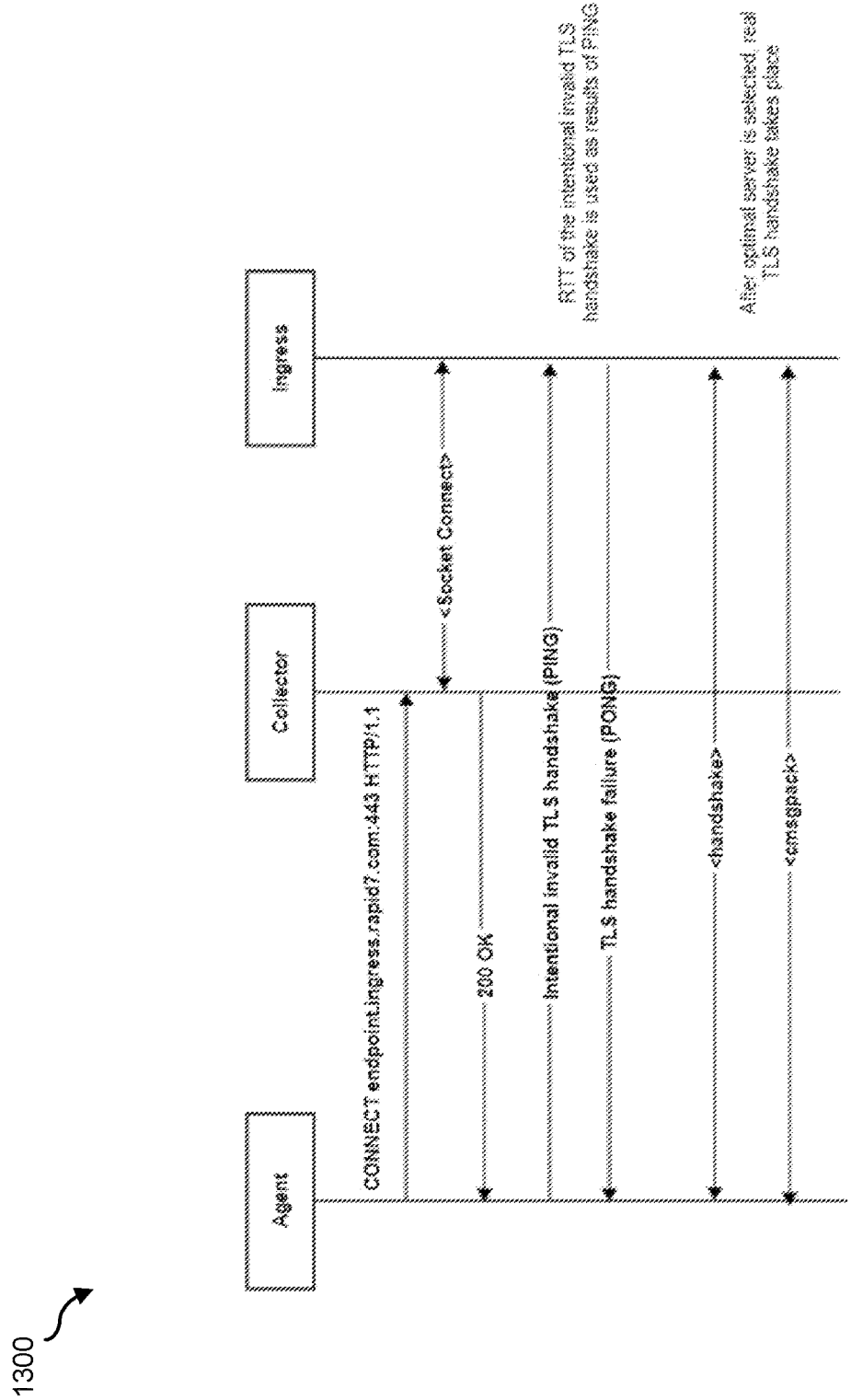
FIG. 13 is a block diagram 1300 illustrating an alternative method to ping endpoints, according to one embodiment of the present disclosure.

FIG. 13 is a block diagram 1300 illustrating an alternative method to ping endpoints, according to one embodiment. In certain embodiments, transport Layer Security (TLS) protocol is leveraged and an intentionally bad TLS handshake request is sent that is subsequently rejected by the server. However, since the rejection indicates that the server has indeed been "pinged," the RTT of the request (and rejection) can be used in the smart connection (noted above).

In existing implementations, there exists a dedicated protocol and port to ping a service. Advantageously, the foregoing approach eliminates both requirements by leveraging TLS protocol on the sole communication port. The foregoing greatly simplifies networking setup requirements for customers and also makes data connection and analysis (DCA) by the agent and other solutions less restricted by customers' network setup and configuration policies.

In one embodiment, a request with an intentionally bad Transport Layer Security (TLS) handshake is transmitted from an agent (e.g., Agent 1005 of FIG. 10) to a server and an indication that the request has been rejected is received from the server. The RTT of the request and the rejection the request is determined and the server is pinged (again) based on the RTT. In the foregoing example, the pinging does not require whitelisting of an extra port and the pinging does not negatively interact with network intermediaries that support protocol detection.

Figure 14A:
FIG. 14A is a risk analysis table 1400A, according to one embodiment of the present disclosure.

FIG. 14A is a risk analysis table 1400A, according to one embodiment. Agent communication presents a risk area because if Agent 1005 cannot ping any services successfully, it would not be able to establish a connection with the Platform (e.g., platform gateway service 1020 as shown in FIG. 10). In certain embodiments, mitigation of the foregoing problem can be performed using the following steps: (a) testing that a public ingress endpoint and a collector respond as expected to an Secure Sockets Layer (SSL) ping, (b) testing that a proxy (e.g., SNI reverse proxy provided by platform gateway service 1020 as shown in FIG. 11) permits the SSL ping when protocol detection is on, (c) ensuring that the SSL ping is configurable by the Platform, and (d) failing back to rapid7.ping (the proprietary ping) if the SSL ping is not successful.

FIG. 14B is a test scenario table 1400B, according to one embodiment. The test case for agent communication involves: (a) configuring direct connected Agent 1005 to use SSL ping with proxy that has protocol detection enabled, (b) configuring direct connected Agent 1005 to use SSL ping with proxy that has protocol detection disabled, (c) configuring direct connected Agent 1005 to use SSL ping with HTTP proxy, (d) configuring directed connected Agent 1005 to use SSL ping with proxy, (e) configuring the collector connected to Agent 1005 to use SSL ping, (f) verifying Agent 1005 behaves the same as before when SSL ping is disabled, (g) verifying SSL ping test result is visible on an operating system distribution (e.g., a Linux distribution like yggdrasil), (h) verifying SSL ping test pass when Agent 1005 is pinging a valid endpoint, and (i) verifying SSL ping test times out and fail when Agent 1005 is pinging an invalid endpoint.

Example Computing and Networking Environment

Figure 15:
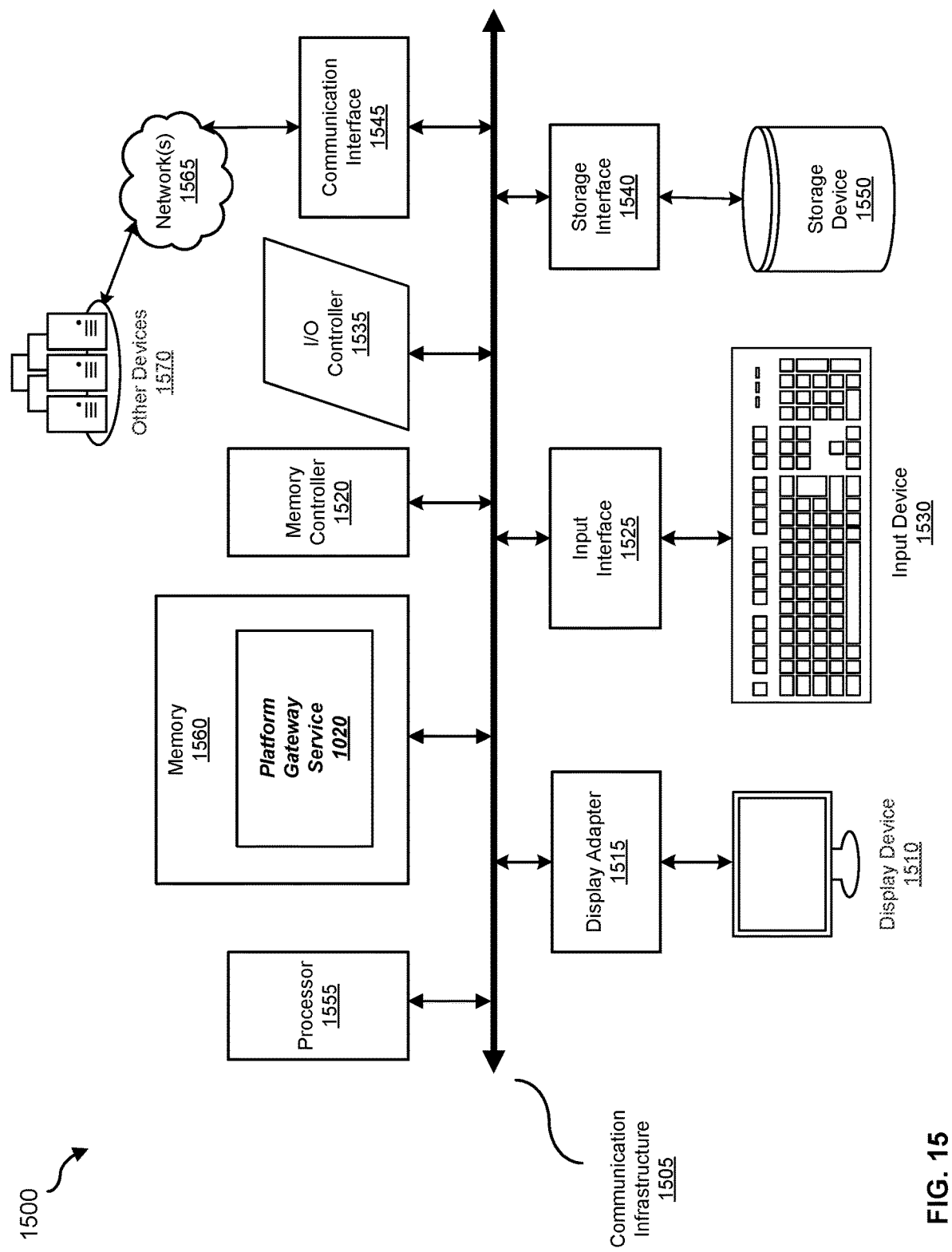
FIG. 15 is a block diagram 1500 of a computing system and networking environment, illustrating how various embodiments disclosed and described herein can be implemented in software, according to one or more embodiments of the present disclosure.

FIG. 15 is a block diagram 1500 of a computing and networking system, illustrating how the systems described in FIGS. 1, 2, 10, and 11 (e.g., platform gateway service 1020, among other components shown in FIGS. 1, 2, 10, and 11) can be implemented in software, according to one embodiment. Computing system 1500 can include the various components illustrated in FIGS. 1, 2, 10, and 11 and broadly represents any single or multi-processor computing device or system capable of executing computer-readable instructions. Examples of computing system 1500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1500 may include at least one processor 1555 and a memory 1560. By executing the software that executes platform gateway service 1020 and one or more other components illustrated in FIGS. 1, 2, 10 and 11, computing system 1500 becomes a special purpose computing device that is configured to simplify networking setup complexity for security agents (e.g., "new" Agent 1005 as shown in FIG. 11).

Processor 1555 generally represents any type or form of processing unit capable of processing data or interpreting and executing instructions. In certain embodiments, processor 1555 may receive instructions from a software application or module. These instructions may cause processor 1555 to perform the functions of one or more of the embodiments described and/or illustrated herein. For example, processor 1555 may perform and/or be a means for performing all or some of the operations described herein. Processor 1555 may also perform and/or be a means for performing any other operations, methods, or processes described and/or illustrated herein.

Memory 1560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 1500 may include both a volatile memory unit and a non-volatile storage device. In one example, program instructions implementing platform gateway service 1020 and one or more other components illustrated in FIG. 1, 2, 10, or 11 may be loaded into memory 1560.

In certain embodiments, computing system 1500 may also include one or more components or elements in addition to processor 1555 and/or memory 1560. For example, computing system 1500 may include a memory controller 1520, an Input/Output (I/O) controller 1535, and a communication interface 1545, each of which may be interconnected via a communication infrastructure 1505. Communication infrastructure 1505 generally represents any type or form of infrastructure capable of facilitating communication between one or more components of a computing device. Examples of communication infrastructure 1505 include, without limitation, a communication bus (such as an Industry Standard Architecture (ISA), Peripheral Component Interconnect (PCI), PCI express (PCIe), or similar bus) and a network.

Memory controller 1520 generally represents any type/form of device capable of handling memory or data or controlling communication between one or more components of computing system 1500. In certain embodiments memory controller 1520 may control communication between processor 1555, memory 1560, and I/O controller 1535 via communication infrastructure 1505. In certain embodiments, memory controller 1520 may perform and/or be a means for performing, either alone or in combination with other elements, one or more of the operations or features described and/or illustrated herein. I/O controller 1535 generally represents any type or form of module capable of coordinating and/or controlling the input and output functions of a computing device. For example, in certain embodiments I/O controller 1535 may control or facilitate transfer of data between one or more elements of computing system 1500, such as processor 1555, memory 1560, communication interface 1545, display adapter 1515, input interface 1525, and storage interface 1540.

Communication interface 1545 broadly represents any type/form of communication device/adapter capable of facilitating communication between computing system 1500 and other devices and may facilitate communication between computing system 1500 and a private or public network. Examples of communication interface 1545 include, a wired network interface (e.g., network interface card), a wireless network interface (e.g., a wireless network interface card), a modem, and any other suitable interface. Communication interface 1545 may provide a direct connection to a remote server via a direct link to a network, such as the Internet, and may also indirectly provide such a connection through, for example, a local area network. Communication interface 1545 may also represent a host adapter configured to facilitate communication between computing system 1500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 1500 may also include at least one display device 1510 coupled to communication infrastructure 1505 via a display adapter 1515 that generally represents any type or form of device capable of visually displaying information forwarded by display adapter 1515. Display adapter 1515 generally represents any type or form of device configured to forward graphics, text, and other data from communication infrastructure 1505 (or from a frame buffer, as known in the art) for display on display device 1510. Computing system 1500 may also include at least one input device 1530 coupled to communication infrastructure 1505 via an input interface 1525. Input device 1530 generally represents any type or form of input device capable of providing input, either computer or human generated, to computing system 1500. Examples of input device 1530 include a keyboard, a pointing device, a speech recognition device, or any other input device.

Computing system 1500 may also include storage device 1550 coupled to communication infrastructure 1505 via a storage interface 1540. Storage device 1550 generally represents any type or form of storage devices or mediums capable of storing data and/or other computer-readable instructions. For example, storage device 1550 may include a magnetic disk drive (e.g., a so-called hard drive), a floppy disk drive, a magnetic tape drive, an optical disk drive, a flash drive, or the like. Storage interface 1540 generally represents any type or form of interface or device for transmitting data between storage device 1550, and other components of computing system 1500. Storage device 1550 may be configured to read from and/or write to a removable storage unit configured to store computer software, data, or other computer-readable information.

Examples of suitable removable storage units include a floppy disk, a magnetic tape, an optical disk, a flash memory device, or the like. Storage device 1550 may also include other similar structures or devices for allowing computer software, data, or other computer-readable instructions to be loaded into computing system 1500. For example, storage device 1550 may be configured to read and write software, data, or other computer-readable information. Storage device 1550 may also be a part of computing system 1500 or may be separate devices accessed through other interface systems.

Many other devices or subsystems may be connected to computing system 1500. Conversely, all of the components and devices illustrated in FIG. 15 need not be present to practice the embodiments described and/or illustrated herein. The devices and subsystems referenced above may also be interconnected in different ways from that shown in FIG. 15. Computing system 1500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1500 for storage in memory via a network such as the Internet or upon a carrier medium. The computer-readable medium containing the computer program may be loaded into computing system 1500. All or a portion of the computer program stored on the computer-readable medium may then be stored in memory 1560, and/or various portions of storage device 1550. When executed by processor 1555, a computer program loaded into computing system 1500 may cause processor 1555 to perform and/or be a means for performing the functions of one or more of the embodiments described/illustrated herein. Alternatively, one or more of the embodiments described and/or illustrated herein may be implemented in firmware and/or hardware.

Network(s) 1565 generally represents any type or form of computer networks or architectures capable of facilitating communication between the systems of FIGS. 1, 2, 10 and 11 and other devices 1570, including Agent 1005 and non-agent sources 1010. For example, network 1565 can be a Wide Area Network (WAN) (e.g., the Internet) or a Local Area Network (LAN). In certain embodiments, a communication interface, such as communication interface 1545 in FIG. 15, may be used to provide connectivity between various endpoints (agent and non-agent), the various components of the computing systems of FIGS. 1, 2, 10, and 11 (e.g., the disparate load balancers, SNI reverse proxy, endpoint ingress APIs of one or more server instances, endpoint boss application), and network 1565. The embodiments described and/or illustrated herein are not limited to the Internet or any particular network-based environment.

In some examples, all or a portion of the systems and components illustrated in FIGS. 1, 2, 10, and 11 may represent portions of a cloud-computing or network-based environment. Cloud-computing environments may provide various services and applications via the Internet. These cloud-based services may be accessible through a web browser or other remote interface. Various functions described herein may be provided through a remote desktop environment or any other cloud-based computing environment. Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
  transmitting, from an agent to a server, a request with an intentionally bad Transport Layer Security (TLS) handshake, wherein the server is a destination of the request;
  receiving, from the server, an indication that the request has been rejected;
  determining the Round Trip Time (RTT) of the request and rejection of the request; and
  pinging the server based on the RTT.

2. The computer-implemented method of claim 1, wherein
  the pinging does not require whitelisting of an extra port.

3. The computer-implemented method of claim 1, wherein
  the pinging does not negatively interact with one or more network intermediaries that support protocol detection.

4. A non-transitory computer readable storage medium comprising program instructions executable to:
  transmit, from an agent to a server, a request with an intentionally bad Transport Layer Security (TLS) handshake, wherein the server is a destination of the request;
  receive, from the server, an indication that the request has been rejected;
  determine the Round Trip Time (RTT) of the request and rejection of the request; and
  ping the server based on the RTT, wherein
    the pinging does not require whitelisting of an extra port, and
    the pinging does not negatively interact with one or more network intermediaries that support protocol detection.

5. A system comprising:
  one or more processors; and
  a memory coupled to the one or more processors, wherein the memory stores program instructions executable by the one or more processors to:
  transmit, from an agent to a server, a request with an intentionally bad Transport Layer Security (TLS) handshake, wherein the server is a destination of the request;
  receive, from the server, an indication that the request has been rejected;
  determine the Round Trip Time (RTT) of the request and rejection of the request; and
  ping the server based on the RTT, wherein
    the pinging does not require whitelisting of an extra port, and
    the pinging does not negatively interact with one or more network intermediaries that support protocol detection.

\* \* \* \* \*